US012546832B2

(12) United States Patent
Spiel et al.

(10) Patent No.: US 12,546,832 B2
(45) Date of Patent: Feb. 10, 2026

(54) SHORT CIRCUIT DETECTION APPARATUS (71) Applicant: Future Systems Besitz GmbH, Roedental (DE)

(72) Inventors: Peter Spiel, Regensburg (DE); Bernhard Först, Kronach (DE)

(73) Assignee: Future Systems Besitz GmbH, Roedental (DE)

( * ) Notice: Subject to any disclaimer, the term of this patent is extended or adjusted under 35 U.S.C. 154(b) by 195 days.

(21) Appl. No.: 18/431,588

(22) Filed: Feb. 2, 2024

(65) Prior Publication Data

US 2024/0175939 A1    May 30, 2024

Related U.S. Application Data (63) Continuation of application No. PCT/EP2022/072158, filed on Aug. 5, 2022.

(30) Foreign Application Priority Data

Aug. 5, 2021 (EP) ..................... 21189939

(51) Int. Cl.
*G01R 31/52* (2020.01)
*G01R 15/04* (2006.01)
(Continued)

(52) U.S. Cl.
CPC ............. *G01R 31/52* (2020.01); *G01R 15/04* (2013.01); *G01R 15/18* (2013.01); *G01R 19/257* (2013.01)

(58) Field of Classification Search
CPC ........ G01R 31/52; G01R 15/04; G01R 15/18; G01R 19/257; H02H 3/44; H02H 3/08
See application file for complete search history.

(56) References Cited

U.S. PATENT DOCUMENTS 3,593,124 A    7/1971 Cahen et al.
6,724,597 B1   4/2004 Elischer
(Continued)

FOREIGN PATENT DOCUMENTS

EP    3681003 A1    7/2020
EP    3700038 A1    8/2020
EP    3754346 A1    12/2020

OTHER PUBLICATIONS

International Search Report in the corresponding PCT/EP2022/072158, mailed Jan. 10, 2023.

*Primary Examiner* — Lee E Rodak
*Assistant Examiner* — Demetrius R Pretlow
(74) *Attorney, Agent, or Firm* — Maginot, Moore & Beck, LLP (57) ABSTRACT A short circuit detection apparatus (1) for detection of an electrical short circuit current flowing in at least one monitored current path comprises an evaluation circuit (8) including at least one programmable or preprogrammed arithmetic unit (8A) adapted to perform at least one arithmetic combination operation, ACOP, on a first voltage, $U_R$, provided by a resistive element (6) of the monitored current path and being proportional to the electrical current, I, flowing via the monitored current path and on a second voltage, $U_L$, provided by an inductive element (7) of the monitored current path and depending on a derivative of the electrical current, dI/dt, flowing via the monitored current path to provide a combined sensor voltage, and including a comparator (8D) adapted to compare the combined sensor voltage provided by the programmable or preprogrammed arithmetic unit (8A) with a preset or an adjustable threshold voltage to generate a short circuit detection signal (SCDS) if the combined sensor voltage exceeds the threshold voltage.

16 Claims, 7 Drawing Sheets (51) Int. Cl.
*G01R 15/18* (2006.01)
*G01R 19/257* (2006.01)

(56) References Cited

U.S. PATENT DOCUMENTS

2013/0342938 A1* 12/2013 Eom ................ H02M 1/32
361/18
2016/0343526 A1* 11/2016 Schicke, II .......... H01H 47/002

\* cited by examiner

SHORT CIRCUIT DETECTION APPARATUS

PRIORITY CLAIM

This application is a continuation of PCT/EP2022/072158, filed on Aug. 5, 2022, which claims priority to European Application No. 21189939.8, filed on Aug. 5, 2021. The disclosure of both applications is specifically incorporated herein by reference.

FIELD OF THE INVENTION

The invention relates to a short circuit detection apparatus for detection of an electrical short circuit current flowing in a monitored current path of a system from a voltage source to an electrical load.

U.S. Pat. No. 3,593,124 A describes a method and device for detecting and localizing phase to phase and phase to earth faults having a computer adapted to trip a circuit breaker.

U.S. Pat. No. 6,724,597 B1 describes a protection device for low voltage networks having a comparator adapted to control a network switch in response to a product of the current and the current rate.

Loads being connected to a voltage source in general require overload and/or overcurrent protection. The voltage source may comprise an AC voltage source such as a power supply system or power distribution system or a DC voltage source such as a battery. The electrical overcurrent flowing through an electrical conductor can cause excessive generation of heat and can consequently damage the electrical equipment or load. There are different scenarios for causing an overcurrent including short circuits, an incorrect circuit design or ground faults. Conventional overcurrent protection devices include fuses, electromechanical circuit breakers or solid state power switches. Fuses do melt only at relative high current amplitudes so that much electrical energy is transferred to the connected load before the respective fuse does melt thus increasing the risk of damaging components of the respective load. In fact a minimum melting/arcing energy is required. This causes high currents to flow and may take a significant time.

Other conventional electrical protection devices include current sensors to measure an electrical current flowing to the connected load to detect a critical situation and to trigger automatically an electronic or electromechanical switch in case that the critical situation does occur. Some conventional protection circuits use semiconductor switches such as MOSFETs to protect connected loads against overcurrents. Most conventional protection circuits work comparatively slow and require a high current level to trigger the connected switch. There are many different use cases and scenarios where short circuit detection of an electrical short circuit current flowing along a current path is required. Because of the high variety of different types of voltage sources and connected loads there are many different use cases requiring different characteristics of the short circuit detection apparatus.

Accordingly, it is an object of the present invention to provide a short circuit detection apparatus that can be flexibly adapted to different application requirements and which provides a reliable and effective detection of a short circuit current flowing in a current path from a voltage source to a connected load.

This object is achieved according to a first aspect of the present invention by a short circuit detection apparatus comprising the features of claim 1.

The short circuit detection apparatus is used for detection of an electrical short circuit current flowing in at least one monitored current path from a voltage source to an electrical load.

The short circuit detection apparatus is connected to the monitored current path and comprises an evaluation circuit, said evaluation circuit including at least one programmable or preprogrammed arithmetic unit adapted to perform at least one arithmetic combination operation on a first voltage provided by a resistive element of the monitored current path and being proportional to the electrical current flowing via the monitored current path and on a second voltage provided by an inductive element of the monitored current path and depending on a derivative of the electrical current flowing via the monitored current path to provide a combined sensor voltage and including a comparator adapted to compare the combined sensor voltage provided by the programmable arithmetic unit with a preset or an adjustable threshold voltage to generate a short circuit detection signal if the combined sensor voltage exceeds the threshold voltage.

The first voltage and/or the second voltage are amplified by an associated amplifier of the evaluation circuit to provide amplified voltages.

Each amplifier of the evaluation circuit comprises an adjustable gain and an adjustable offset.

The amplified first voltage output by a first amplifier of the evaluation circuit and the amplified second voltage output by a second amplifier of the evaluation circuit are both supplied as input to the programmable or preprogrammed arithmetic unit of the evaluation circuit which is adapted to perform the at least one arithmetic operation on the input amplified voltages to provide the combined sensor voltage applied to the comparator of the evaluation circuit.

If the electrical current flowing in the at least one monitored current path comprises an AC current provided by an AC voltage source a sign of the amplified first voltage output by a first amplifier of the evaluation circuit and a sign of the amplified second voltage output by a second amplifier of the evaluation circuit are both determined and evaluated, wherein if the first and second sign are not equal the arithmetic combination operation performed by the programmable arithmetic unit is automatically inhibited to avoid a false triggering of the comparator of the evaluation circuit.

The programming of the arithmetic unit can be done by a user or during manufacturing of the product itself. The possibility of user programming allows even more flexibility including auto learning or auto adjustment of parameters.

In a possible embodiment of the short circuit detection apparatus according to the first aspect of the present invention, the programmable or preprogrammed arithmetic unit of the evaluation circuit is adapted to perform the at least one arithmetic combination operation on the first voltage and the second voltage by performing at least one arithmetic summation operation.

In a further possible embodiment of the short circuit detection apparatus according to the first aspect of the present invention, the programmable or preprogrammed arithmetic unit of the evaluation circuit is adapted to perform the at least one arithmetic combination operation on the first voltage and the second voltage by performing an arithmetic multiplication operation.

In a still further possible embodiment of the short circuit detection apparatus according to the first aspect of the present invention, the programmable or preprogrammed arithmetic unit of the evaluation circuit is adapted to perform the at least one arithmetic combination operation on the first voltage and the second voltage by performing an arithmetic power or exponentiation operation.

In a further possible embodiment of the short circuit detection apparatus according to the first aspect of the present invention, the short circuit detection signal output by the comparator of the evaluation circuit is supplied to a control logic adapted to control the at least one switch or other actuator provided in the monitored current path.

In a possible embodiment of the short circuit detection apparatus according to the first aspect of the present invention, the switch of the monitored current path comprises a semiconductor switch, in particular a MOSFET, or an electromechanical switch, in particular an electromagnetic relay.

In a further possible embodiment of the short circuit detection apparatus according to the first aspect of the present invention, the semiconductor switch of the monitored current path comprises or forms the resistive element of the monitored current path.

In a still further possible embodiment of the short circuit detection apparatus according to the first aspect of the present invention, the inductive element of the monitored current path comprises a coil connected in series with the resistive element in the monitored current path.

In a further possible embodiment of the short circuit detection apparatus according to the first aspect of the present invention, the inductive element comprises an inductance of a transformer having a primary winding provided in the monitored current path and having a secondary winding connected to the arithmetic unit of the evaluation circuit, wherein the inductance of the transformer comprises a stray inductance and a magnetizing inductance and wherein the resistance of the primary winding of the transformer forms the resistive element of the monitored current path.

In a further possible embodiment of the short circuit detection apparatus according to the first aspect of the present invention, the voltage source connected to the short circuit detection apparatus comprises a voltage source of a power supply system or of a power distribution system including an AC voltage source providing an AC current flowing in the monitored current path to the electrical load.

In a further possible embodiment of the short circuit detection apparatus according to the first aspect of the present invention, the voltage source connected to the short circuit detection apparatus comprises a DC voltage source providing a DC current flowing through the monitored current path to the electrical load.

In a still further possible embodiment of the short circuit detection apparatus according to the first aspect of the present invention, the programmable arithmetic unit of the evaluation circuit comprises a programmable hardware device, in particular a field programmable gate array, a digital signaling processor, an ASIC or another hardwired circuit adapted to perform the at least one arithmetic combination operation. The arithmetic unit can be set up with a fast/real time asynchronous logic device in order to maintain the short reaction time. This provides a short computation time.

In a further possible embodiment of the short circuit detection apparatus according to the first aspect of the present invention, the evaluation circuit of said short circuit detection apparatus further comprises a microcontroller adapted to set operation parameters of the programmable or preprogrammed arithmetic unit, operation parameters of the amplifiers and operation parameters of the comparator of the evaluation circuit.

In a further possible embodiment of the short circuit detection apparatus according to the first aspect of the present invention, the microcontroller of the evaluation circuit has access to a non-volatile memory of said short circuit detection apparatus, wherein the non-volatile memory stores multiple selectable configuration setups of operation parameters.

In a further possible embodiment of the short circuit detection apparatus according to the first aspect of the present invention, the short circuit detection apparatus further comprises an analog to digital converter adapted to convert the first voltage provided by the resistive element of the monitored current path, adapted to convert the second voltage provided by the inductive element of the monitored current path and/or adapted to convert the amplified first voltage output by the first amplifier of the evaluation circuit and the amplified second voltage output by the second amplifier of the evaluation circuit to provide corresponding digital voltage values supplied by the analog to digital converter to the microprocessor of the evaluation circuit adapted to process the received digital voltage values to determine an actual load current value and/or to analyze in real time a regular operation behavior of the power supply system or power distribution system.

A classical control loop comprises the provision of sensor data, an error amplification provided in an evaluation unit and an actor. This actor can comprise for instance a relay or a semiconductor device.

A simple example for a load connected to the short circuit detection apparatus is a heater. In such a case the control loop can be implemented by performing the steps of providing a rated current to the system, measuring an effective load current and supplying a PWM control signal to the load actor in such a way that the effective current and rated current become equal.

In a further possible embodiment of the short circuit detection apparatus according to the first aspect of the present invention, at least one arithmetic combination operation executed by the programmable or preprogrammed arithmetic unit of the evaluation circuit is selected in response to a selection control signal generated by the microprocessor of the evaluation circuit, wherein the microprocessor is connected via a programming interface and/or data interface to a remote or a local controller and/or to a local user interface of the short circuit detection apparatus.

In a further possible embodiment of the short circuit detection apparatus according to the first aspect of the present invention, the evaluation circuit of the short circuit detection apparatus comprises a high voltage side connected to the monitored current path and comprises a low voltage side being galvanically isolated from the high voltage side of the evaluation circuit.

In a further possible embodiment of the short circuit detection apparatus according to the first aspect of the present invention, the high voltage side of the evaluation circuit comprises the programmable or preprogrammed arithmetic unit, the comparator, the analog to digital converter and the microcontroller.

In a further possible embodiment of the short circuit detection apparatus according to the first aspect of the present invention, the apparatus further comprises a first voltage divider adapted to divide the voltage supplied by the voltage source to the monitored current path to generate a source voltage measurement and a second voltage divider circuit adapted to divide the voltage supplied to the load to generate a load voltage measurement, wherein the generated source voltage measurement and the generated load voltage measurement are supplied as input to the high voltage side of the evaluation circuit.

In a further possible embodiment of the short circuit detection apparatus according to the first aspect of the present invention, the microprocessor is adapted to perform in real time a FFT analysis to determine harmonics within the electrical load current.

In a still further possible embodiment of the short circuit detection apparatus according to the first aspect of the present invention, the microprocessor is further adapted to calculate in real time an $I^2t$ value of the electrical load current as a stress indicator.

BRIEF DESCRIPTION OF THE DRAWINGS

In the following, possible embodiments of the short circuit detection apparatus according to the present invention are described in more detail with reference to the enclosed figures.

DETAILED DESCRIPTION OF EMBODIMENTS

Figure 1:
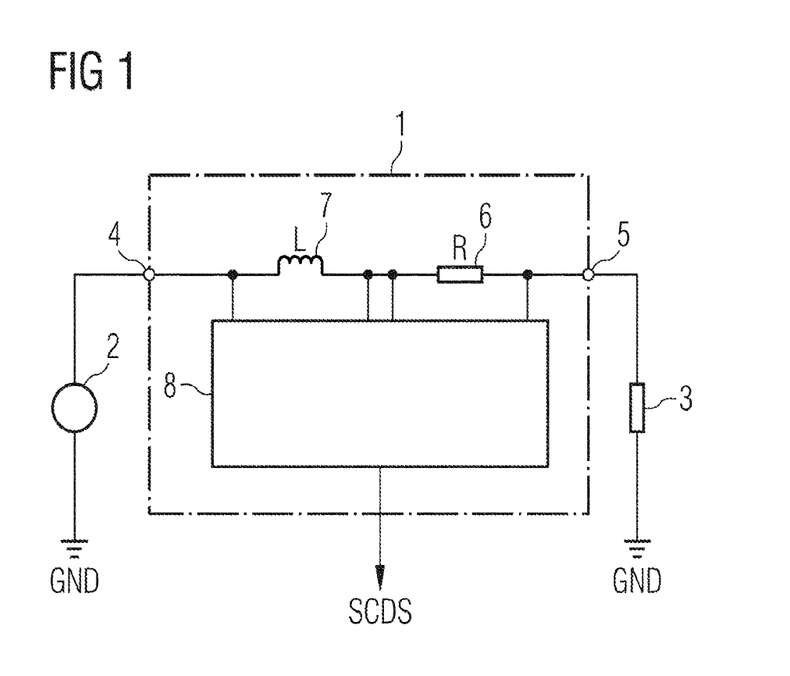
FIG. 1 shows a diagram for illustrating a possible embodiment of a short circuit detection apparatus according to the present invention.

As can be seen from the circuit diagram illustrated in FIG. 1, the short circuit detection apparatus 1 is provided for detection of an electrical short circuit current flowing in at least one monitored current path from a voltage source 2 to an electrical load 3. The short circuit detection apparatus 1 has an input terminal 4 connected to the voltage source 2 and an output terminal 5 connected to the load 3. The load 3 can comprise different types of loads including a resistive load such as a heater, a capacitive load or an inductive load such as an electrical motor. Between the input 4 and the output 5, a current path is provided having a resistive element 6 and an inductive element 7 as illustrated in FIG. 1. The short circuit detection apparatus 1 comprises an evaluation circuit 8 connected to the monitored current path as shown in FIG. 1. The short circuit detection apparatus 1 comprises a housing with an integrated evaluation circuit 8.

Figure 2:
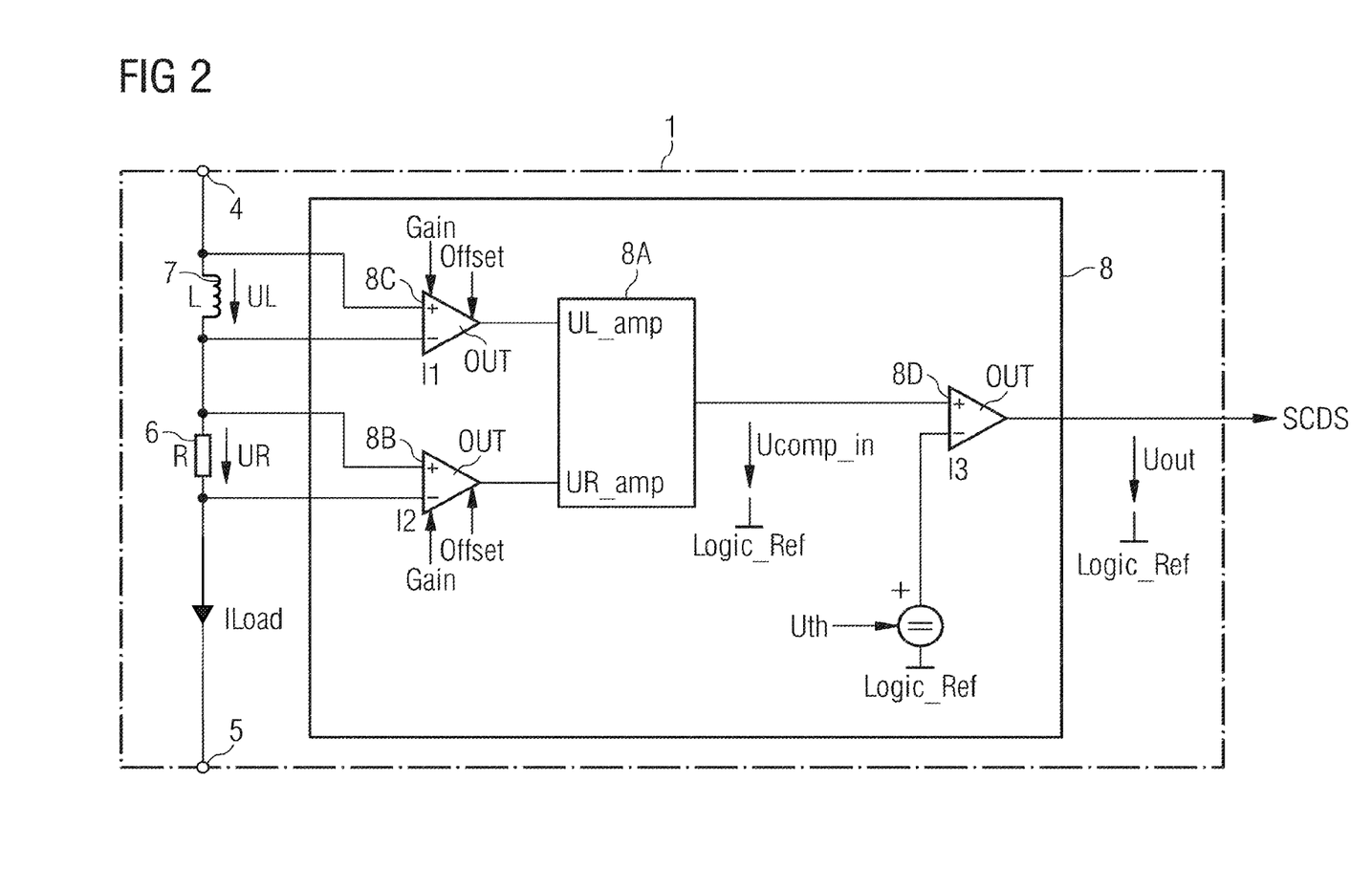
FIG. 2 shows a circuit diagram for illustrating a possible exemplary embodiment of a short circuit detection apparatus according to the present invention.

The evaluation circuit 8 as illustrated in FIG. 2 comprises a fast programmable or a preprogrammed/hardwired fast arithmetic unit 8A adapted to perform at least one arithmetic combination operation ACOP on a first voltage $U_R$ provided by the resistive element 6 of the monitored current path and being proportional to the electrical current I flowing via the monitored current path and on a second voltage $U_L$ provided by the inductive element 7 of the monitored current path and depending on a derivative of the electrical current dI/dt flowing via the monitored current path to provide a combined sensor voltage.

Figure 6:
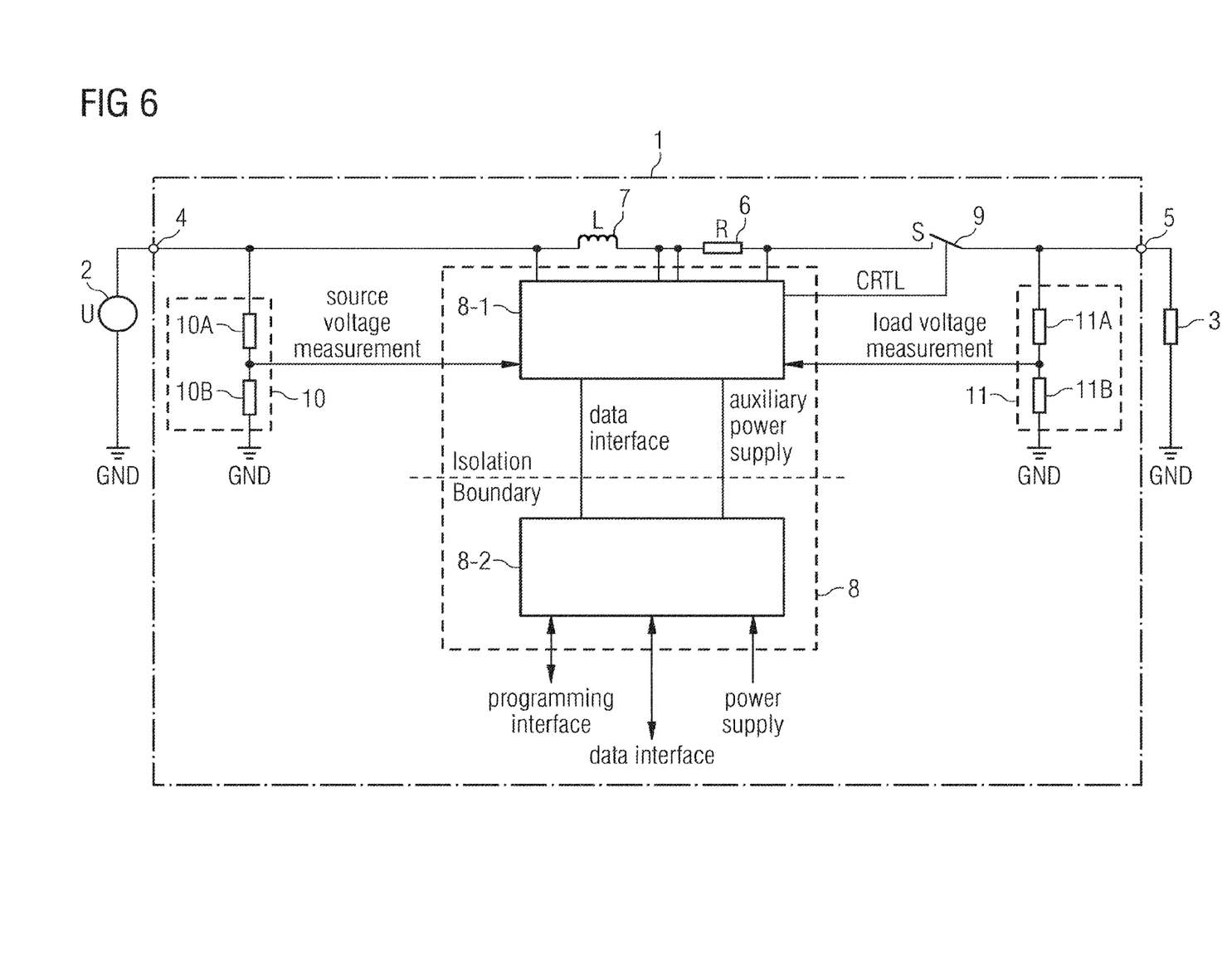
FIG. 6 shows a further circuit diagram for illustrating a possible exemplary embodiment of a short circuit detection apparatus according to the present invention.

The evaluation circuit 8 further comprises a comparator 8D adapted to compare the combined sensor voltage provided by the programmable or preprogrammed arithmetic unit 8A with a preset or with an adjustable threshold voltage Uth to generate a short circuit detection signal SCDS if the combined sensor voltage exceeds the threshold voltage Uth. The short circuit detection signal SCDS output by the comparator 8D of the evaluation circuit 8 can be supplied in a possible embodiment to a control logic which is adapted to control at least one switch or another actuator 9 as illustrated in FIG. 6 provided in the monitored current path between the input terminal 4 and the output terminal 5 of the short circuit detection apparatus 1. The switch 9 can comprise in a possible implementation a semiconductor switch, in particular a MOSFET. In an alternative embodiment, the switch 9 can also comprise an electromechanical switch, in particular an electromagnetic relay. In a possible embodiment, a drain-source channel of a semiconductor switch of the monitored current path can form the resistive element 6 of the monitored current path. The inductive element 7 of the monitored current path can comprise in a possible embodiment a coil connected in series with the resistive element 6 of the monitored current path. The inductive element 7 can also be formed by a parasitic inductance of a component.

The voltage source 2 connected to the input terminal 4 of the short circuit detection apparatus 1 can comprise in a possible embodiment a voltage source of a power distribution system or of a power supply system including an AC voltage source providing an AC current flowing in the monitored current path to the electrical load.

The input terminal 4 can be connected to a busbar of a power distribution system or power supply system. The busbar is provided to supply the AC voltage or a DC voltage generated by DC-voltage source to an input terminal 4 of the short circuit detection apparatus 1. In possible embodiment the short circuit detection apparatus 1 comprises several input terminals 4 connected via associated current paths to a corresponding number of output terminals 5.

In an alternative embodiment, the voltage source 2 connected to the at least one input terminal 4 of the short circuit detection apparatus 1 can also comprise a DC voltage source such as a battery providing a DC current flowing in the monitored current path to the electrical load 3. The short circuit detection apparatus 1 according to the present invention is located between the voltage source 2 and the load 3 as illustrated in FIG. 1. The resistive element 6 and the inductive element 7 can comprise discrete components such as a resistor and a coil. It is also possible that the resistive element 6 and the inductive element 7 are formed by parasitic elements already available in the respective application or use case. In a possible embodiment, the resistive element 6 can be formed by the ohmic resistance of a load wire connecting the load 3 to the voltage source 2.

FIG. 2 shows a circuit diagram for illustrating a possible exemplary embodiment of the short circuit detection apparatus 1 according to the present invention. FIG. 2 shows a short circuit detection apparatus 1 which can be used for an unisolated DC application. In the illustrated embodiment, the evaluation circuit 8 comprises a programmable arithmetic unit 8A. Further, the evaluation circuit 8 comprises a first amplifier 8B and a second amplifier 8C used to amplify applied voltages. As illustrated in FIG. 2, the voltage along the resistive element 6 is amplified by the first amplifier 8B and the voltage along the inductive element 7 is amplified by the second amplifier 8C. The provision of the amplifiers 8B, 8C is optional. The programmable arithmetic unit 8A of the evaluation circuit 8 is adapted to perform at least one arithmetic combination operation ACOP on the first voltage $U_R$ along the resistive element 6 and on the second voltage $U_L$ along the inductive element 7. In the embodiment illustrated in FIG. 2, the programmable arithmetic unit 8A performs the arithmetic combination operation ACOP on the amplified voltages output by the first and second amplifier 8B, 8C.

The programmable arithmetic unit 8A is adapted to perform at least one arithmetic combination operation ACOP which can comprise in a possible implementation an arithmetic summation operation (ACOP1) where both voltages supplied to the arithmetic unit 8A are added to each other to provide a combined sensor voltage. The arithmetic combination operation performed by the programmable arithmetic unit 8A can also comprise an arithmetic multiplication operation (ACOP2) wherein the applied voltages are multiplied with each other to provide the combined sensor voltage output by the programmable arithmetic unit. In a still further possible embodiment, the arithmetic combination operation performed by the programmable arithmetic unit 8A can also comprise an arithmetic power or exponentiation operation (ACOP3).

The arithmetic combination operations ACOP performed by the arithmetic unit 8A can be preprogrammed/hardwired or programmable and is suited for the respective use case and safety requirements of the system or connected load 3, in particular sensitivity requirements and switch-off requirements such as switch-off periods and or load type of the connected load 3.

In a possible embodiment the short circuit detection apparatus 1 comprises a volatile or non-volatile configuration memory which translates system requirements or parameters into a suitable matching arithmetic combination operation ACOP performed by the arithmetic unit 8A during operation of the system. The system requirements or parameters can be received from a system controller of the system or input by a user via a user interface of the monitored system or of the short circuit detection apparatus 1 itself. For example if the user does input via a user interface that the voltage source 2 of the system is an AC-source another arithmetic combination operation ACOP is used than if the user does input that the voltage source 2 of the system is a DC voltage source.

In a still further embodiment several preprogrammed arithmetic operation units 8A-1, 8A-2, . . . 8A-N are integrated in parallel in a fire resilient housing of the short circuit detection apparatus 1 and can be activated or enabled in response to a received internal enable control signal ENABLE generated by a microcontroller 8H of the short circuit detection apparatus 1 depending on current user input settings or a configuration stored in the configuration memory. Only one operation unit 8-$i$ is enabled at the same time. A switch over from a first integrated arithmetic operation unit 8A-$i$ to another integrated arithmetic operation unit 8A-$j$ can be performed in a possible embodiment of the short circuit detection apparatus 1 in real time during operation of the monitored system or load 3. For instance in a high safety operation mode of the short circuit detection apparatus 1 or system an arithmetic combination operation ACOP is applied providing a higher sensitivity to current slopes dI/dt and with lower threshold values Uth for the comparator 8D can be used than in a normal operation mode of the short circuit detection apparatus 1 or system, e.g. an arithmetic combination operation ACOP3 might be used instead of arithmetic combination operation ACOP1.

The combined sensor voltage generated by the programmable arithmetic unit 8A is supplied to a comparator 8D of the evaluation circuit 8 of said short circuit detection apparatus 1. The comparator 8D is adapted to compare the received combined sensor voltage provided by the programmable or preprogrammed arithmetic unit 8A with a preset or an adjustable threshold voltage $U_{th}$ to generate the short circuit detection signal SCDS if the combined sensor voltage exceeds the threshold voltage $U_{th}$. The short circuit detection signal SCDS output by the comparator 8D of the evaluation circuit 8 can be supplied to a control logic or controller. This control logic can for instance comprise a microcontroller, a PLC or a PC system. The control logic in turn can be adapted to control at least one switch or another actuator 9 provided in the monitored current path. This switch or actuator 9 can be provided to separate, i.e. switch off, the load 3 in case that the short circuit detection signal SCDS is output by the comparator 8D to the control logic. In a possible embodiment also a two position switch 9 can be used wherein in a first position the power source 2 is connected to the load 3 and wherein in a second position the power source 2 is disconnected and the load 3 is switched to ground.

In a possible embodiment, the monitored current path can comprise a semiconductor switch, in particular a MOSFET, or an electromechanical switch, in particular an electromagnetic relay, which are controlled by the control logic in response to the received short circuit detection signal SCDS output by the comparator 8D. The arithmetic unit 8A of the evaluation circuit 8 illustrated in FIG. 2 can be adapted to perform a logic or algebraic operation on the output values or output signals received from the signal amplifiers 8B, 8C. The output of the arithmetic unit or arithmetic block 8A can be compared by the comparator 8D with the adjustable or preset threshold voltage $U_{th}$. If the processed signal exceeds a threshold value Uth this signal is passed to the system control logic.

From a broad range of possible arithmetic combination operations ACOPs, in the following three examples are described in more detail. In these cases, a processed signal $U_{comp\_in}$ output by the arithmetic block 8A and applied to the comparator 8D is always bigger than the input signal. This is relevant to ensure that the impact from the voltages received from the resistive and inductive element 6, 7 cannot be neglected or filtered away.

The comparison of the processed signal output by the arithmetic unit 8A $U_{comp\_in}$ with the threshold voltage $U_{th}$ is described as:

$$U_{out=} \begin{cases} \text{Logic high for } U_{comp\_in} > U_{th} \\ \text{Logic low for } U_{comp\_in} < U_{th} \end{cases} \quad (1)$$

In a possible embodiment, the arithmetic combination operation comprises an arithmetic summation operation ACOP 1 where both input signals output by the amplifiers 8B, 8C are summed up by the arithmetic unit 8A as follows:

$$U_{comp\_in} = (U_L + \text{Offset}_L)\text{Gain}_L + (U_R + \text{Offset}_R)\text{Gain}_R = \quad (2)$$

$$\left(L\frac{d}{dt}I_{Load} + \text{Offset}_L\right)\text{Gain}_L + (RI_{Load} + \text{Offset}_R)\text{Gain}_R$$

wherein both amplifiers 8B, 8C comprise an offset and a gain. The offset is not mandatory and can be zero (Offset$_L$, Offset$_R$=0). The Gain$_L$, Gain$_R$ terms of the equation allow a fine tuning which information of the input signal (amplitude or slope of the electrical current I) does have the major impact on the combined sensor voltage output by the arithmetic unit 8A to the comparator 8D. The short circuit detection apparatus 1 according to the present invention allows the values of the resistive element 6 and the inductive element 7 to be chosen or configured according to the application demands and not depending on the required signal range for a proper evaluation. In a possible implementation, the resistance R of the resistive element 6 and the inductivity L of the inductive element 7 are also adjustable or tunable depending on the use case. The resistive element 6 and the inductive element 7 can also be formed by parasitic elements.

In a further possible embodiment, the arithmetic combination operation performed by the programmable arithmetic unit 8A can also comprise a multiplication operation ACOP2. If this arithmetic combination operation is programmed both input signals are multiplied with each other:

$$U_{comp\_in} = (U_L + \text{Offset}_L)\text{Gain}_L \cdot (U_R + \text{Offset}_R)\text{Gain}_R = \quad (3)$$
$$\left(L\frac{d}{dt}I_{Load} + \text{Offset}_L\right)\text{Gain}_L \cdot (RI_{Load} + \text{Offset}_R)\text{Gain}_R$$

In this scenario, a provision of an offset value of at least 1 is advantageous because otherwise the light load signal might become very small.

In a still further possible embodiment, the arithmetic combination operation performed by the programmable arithmetic unit 8A comprises an arithmetic power or exponentiation operation ACOP3. Placing the value of the signal received from the inductive element 7 into the exponent allows to provide a short circuit detection apparatus 1 which is very sensitive to the current slope dI/dt of the electrical current I flowing through the monitored path.

$$U_{comp\_in} = [(U_R + \text{Offset}_R)\text{Gain}_R]^{(U_L+\text{Offset}_L)\text{Gain}_L} = \quad (4)$$
$$[(RI_{Load} + \text{Offset}_R)\text{Gain}_R]^{\left(L\frac{d}{dt}I_{Load}+\text{Offset}_L\right)\text{Gain}_L}$$

Figure 3:
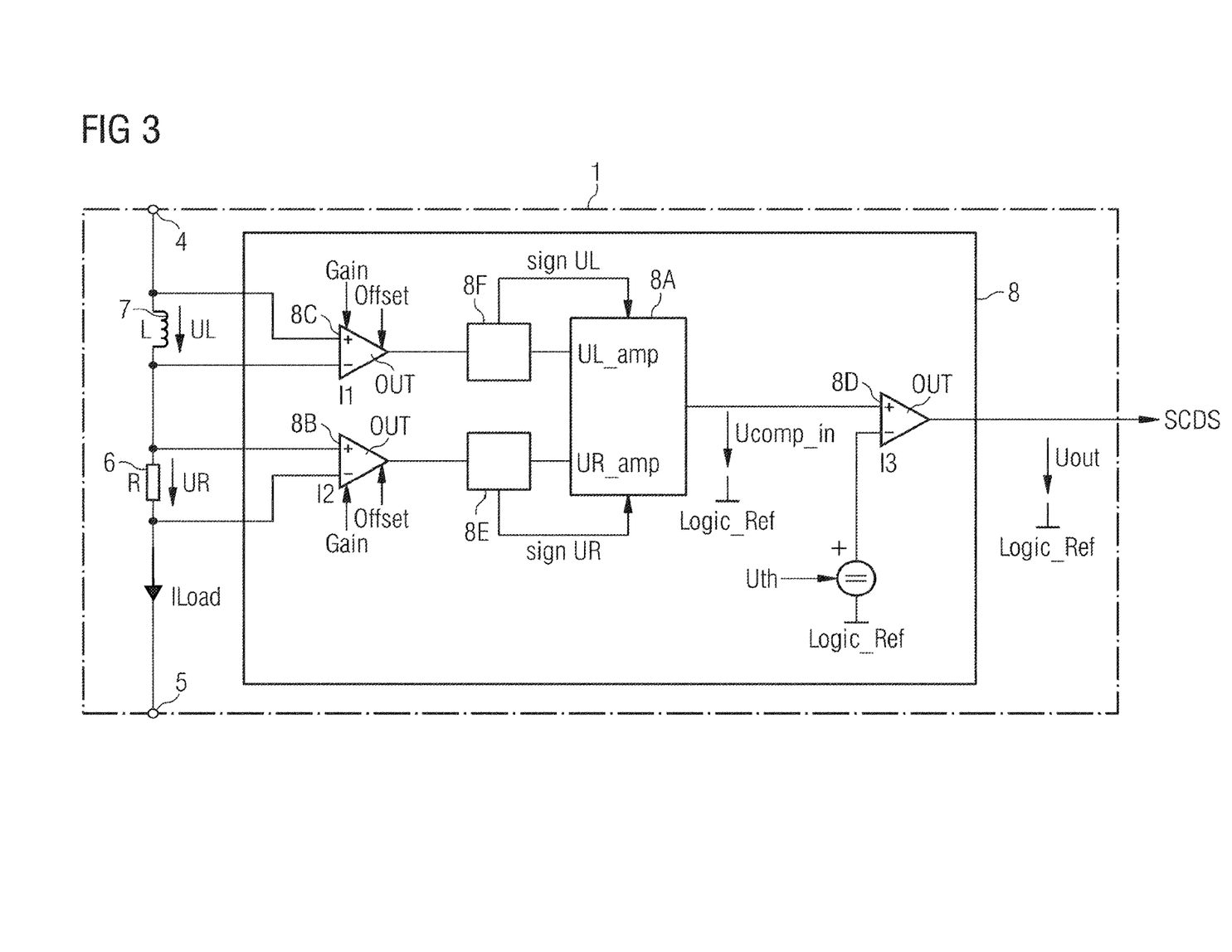
FIG. 3 shows a further circuit diagram for illustrating a possible exemplary embodiment of a short circuit detection apparatus according to the present invention.

The arithmetic block or arithmetic unit 8A of the short circuit detection apparatus 1 is implemented as a hardware circuit to fulfil real-time response requirements. In a preferred embodiment, the response time of the preprogrammed or programmable arithmetic unit 8A is less than 1 millisecond. In a preferred embodiment, the response time of the arithmetic block 8A is less than 10 microseconds. The response time of the arithmetic block 8A depends to some extent on the hardware platform used for the arithmetic block 8A. The programmable arithmetic unit 8A can comprise in a possible embodiment a field programmable gate array FPGA. In a further possible embodiment, the programmable arithmetic unit 8A of the evaluation circuit 8 comprises a digital signal processor DSP. In a still further possible embodiment, the programmable arithmetic unit 8A of the evaluation circuit 8 is implemented in an ASIC (Application Specific Integrated Circuit). It can also be implemented in a mixed signal FPGA. In a possible embodiment, the programmable arithmetic combination operation ACOP performed by the arithmetic unit 8A can be selected from a set or group of preprogrammed arithmetic combination operations ACOPs in response to a selection control signal SEL-ACOP-CRTL received by the arithmetic unit 8A or by microcontroller 8H via an interface from a local or remote control unit or received as a user command CMD from a user interface. In a still further embodiment the preprogrammed arithmetic unit 8A is hardwired and can be exchanged by a user depending on the use case in the field or during production of the short circuit detection circuit 1. In this embodiment the arithmetic unit 8A is integrated in a chip or other housing and can be plugged into a corresponding receiving socket of a printed circuit board PCB of the short current detection apparatus 1. The arithmetic combination operation ACOP (SUM=ACOP1, MULT=ACOP2, EXP=ACOP3) performed by the plugged-in arithmetic unit 8A can displayed in a possible implementation via a user interface to a user and/or signaled via a control interface to a local or remote controller of the system. FIG. 3 shows a circuit diagram for illustrating a further possible exemplary embodiment of a short circuit detection apparatus 1 according to the present invention. The short circuit detection apparatus 1 as illustrated in FIG. 3 can be used for AC applications. For AC applications, the sign of the individual voltage components $U_L$, $U_R$ provided by the resistive element 6 and inductive element 7 is taken into account. This provides also the possibility to detect slope changes of the electrical load current I immediately. This is especially of interest in any kind of systems where a back powering from load 3 to source 2 is possible. In such a case, the sign of the voltage $U_R$ provided by the resistive element 6 might still be positive whereas the voltage $U_L$ provided by the inductive element 7 is already negative. Depending on the specific application or use case, this does help to detect dangerous states earlier. In the embodiment illustrated in FIG. 3, the evaluation circuit 8 further comprises a first calculation block 8E and a second calculation block 8F. The blocks 8E, 8F take the absolute value of $U_R$, $U_L$ before feeding it into the arithmetic unit 8A. If both signs $U_R$, $U_L$ are equal, the arithmetic unit 8A performs the programmed arithmetic combination operation and evaluation as described above. However, if both signs $U_R$, $U_L$ are unequal, the combination operation of $U_R$, $U_L$ is inhibited to avoid a false triggering of the comparator 8D. In this case, the individual sign information can be surpassed to the system control logic. In the embodiment of FIG. 3, the electrical current I flowing in the at least one monitored current path from the input terminal 4 to the output terminal 5 of the short circuit detection apparatus 1 comprises an AC current provided by an AC voltage source 2. A first sign of the amplified first voltage $U_{R\_amp}$ output by the first amplifier 8B of the evaluation circuit 8 and a sign of the amplified second voltage $U_{L\_amp}$ output by the second amplifier 8C of the evaluation circuit 8 are both determined and evaluated. If the first and second sign are not equal, the arithmetic combination operation performed by the programmable arithmetic unit 8A is automatically inhibited to avoid a false triggering of the comparator 8D of the evaluation circuit 8.

Figure 4:
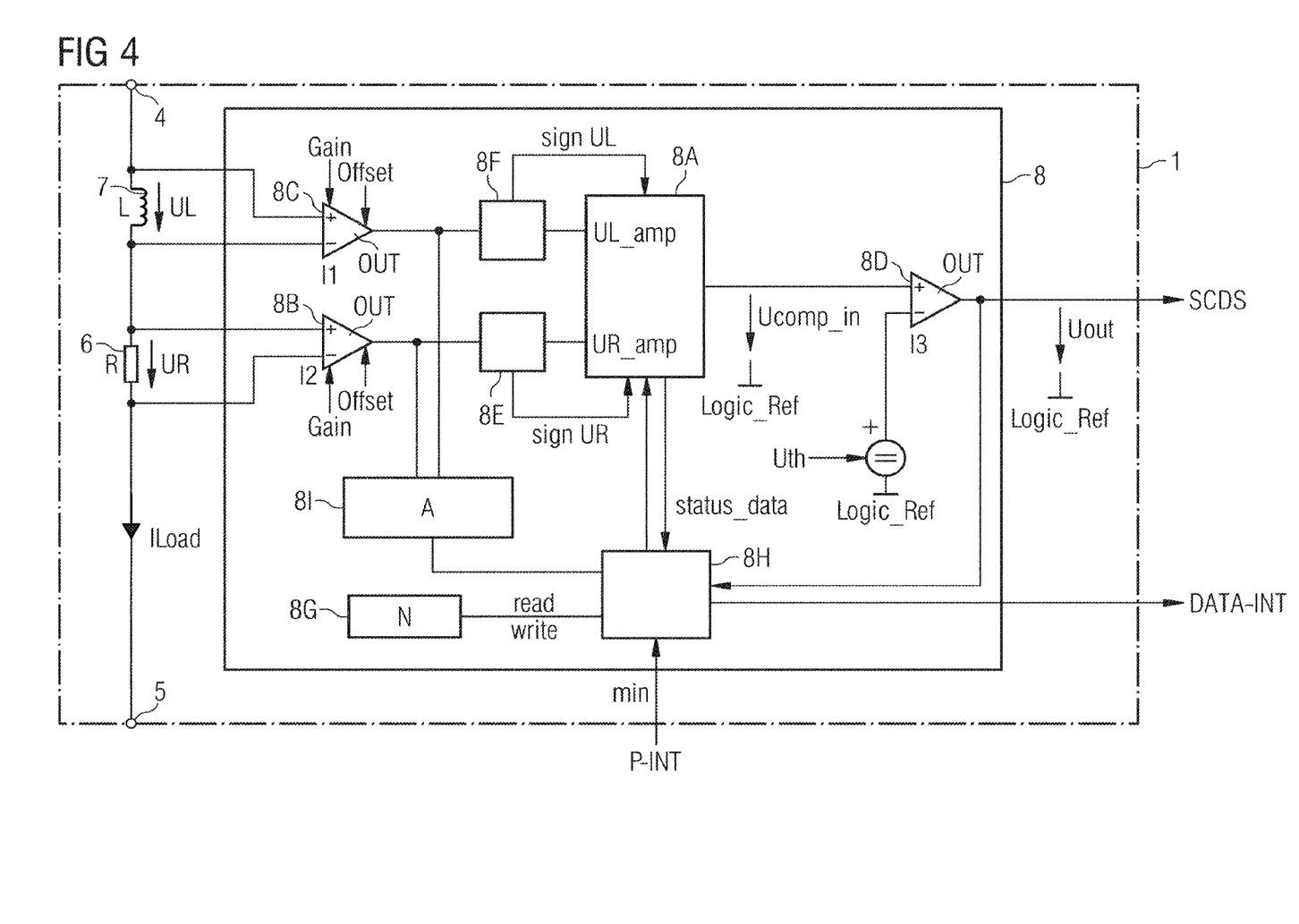
FIG. 4 shows a further circuit diagram for illustrating a possible exemplary embodiment of a short circuit detection apparatus according to the present invention.

FIG. 4 shows a further possible exemplary embodiment of a short circuit detection apparatus 1 according to the present invention. In the illustrated embodiment, a non-volatile memory 8G is included into the evaluation circuit 8. Further, the evaluation circuit 8 comprises in the illustrated embodiment a microcontroller 8H having access to the non-volatile memory 8G for a read or write operation. In the illustrated embodiment of FIG. 4, the short circuit detection apparatus 1 further comprises an analog to digital converter 8I connected in the illustrated implementation to the output of the first and second amplifier 8B, 8C. The microprocessor 8H may be adapted to set operation parameters of the programmable arithmetic unit 8A, operation parameters of the amplifiers 8B, 8C as well as operation parameters of the comparator 8D of the evaluation circuit 8. The microcontroller 8H has access to the non-volatile memory 8G which stores in a possible embodiment multiple selectable configuration setups of operation parameters. The analog to digital converter 8I of the evaluation circuit 8 can be adapted to convert a first amplified voltage $U_{R\_amp}$ output by the first amplifier 8B and the amplified second voltage $U_{L\_amp}$ output by the second amplifier 8C to provide corresponding digital voltage values which are supplied by the analog to digital converter 8I to the microprocessor 8H as illustrated in FIG. 4. The microprocessor 8H of the evaluation circuit 8 is adapted to process the received digital voltage values generated by the analog to digital converter 8I to determine an actual load current value and/or to analyze in real time a regular operation behavior of the respective system.

The at least one programmable arithmetic combination operation ACOP executed by the arithmetic unit 8A of the evaluation circuit 8 is selected in a possible embodiment in response to a selection control signal generated by the microprocessor 8H of the evaluation circuit 8. The microprocessor 8H can be connected via a programming interface or a data interface to a remote or a local controller and/or to a local user interface of the short circuit detection apparatus 1. In a possible embodiment, the microprocessor 8H can be adapted to perform in real time a FFT analysis to determine harmonics within the electrical load current I. In a further possible embodiment, the microprocessor 8H can also be adapted to calculate in real time an $I^2t$ value of the electrical load current I flowing to the electrical load 3 as a stress indicator. For example, the calculated $I^2t$ value over a specific evaluation time period can be compared with limiting values associated with fuses or circuit breakers integrated in the system. In this way, a user can be informed in case a fuse has blown or is about to blow. The FFT analysis of the load current I performed by the microcontroller 8H can reveal harmonic information. By adding the analog to digital converter 8I to the raw values provided by the outputs of the amplifiers 8B, 8C, a second signal path is set up. This path is slower than the hardware arithmetic block 8A but allows additional evaluations by the microcontroller 8H. If an analog to digital converter 8I is integrated in the evaluation circuit 8, the actual load current value is known and can be further processed to provide additional information to the user or other equipment of the system. In other words, the evaluation circuit 8 is in the illustrated embodiment of FIG. 4 capable also to analyze the regular operation of the overall system and not only of an error state. The functions of the microcontroller 8H can be accessed by a programming interface P-INT connected to a PC system, where a graphical user interface GUI can help and guide a user through the evaluation circuit setup of the evaluation circuit 8. Also, measured data can be provided to the PC system for extended analysis.

Figure 5:
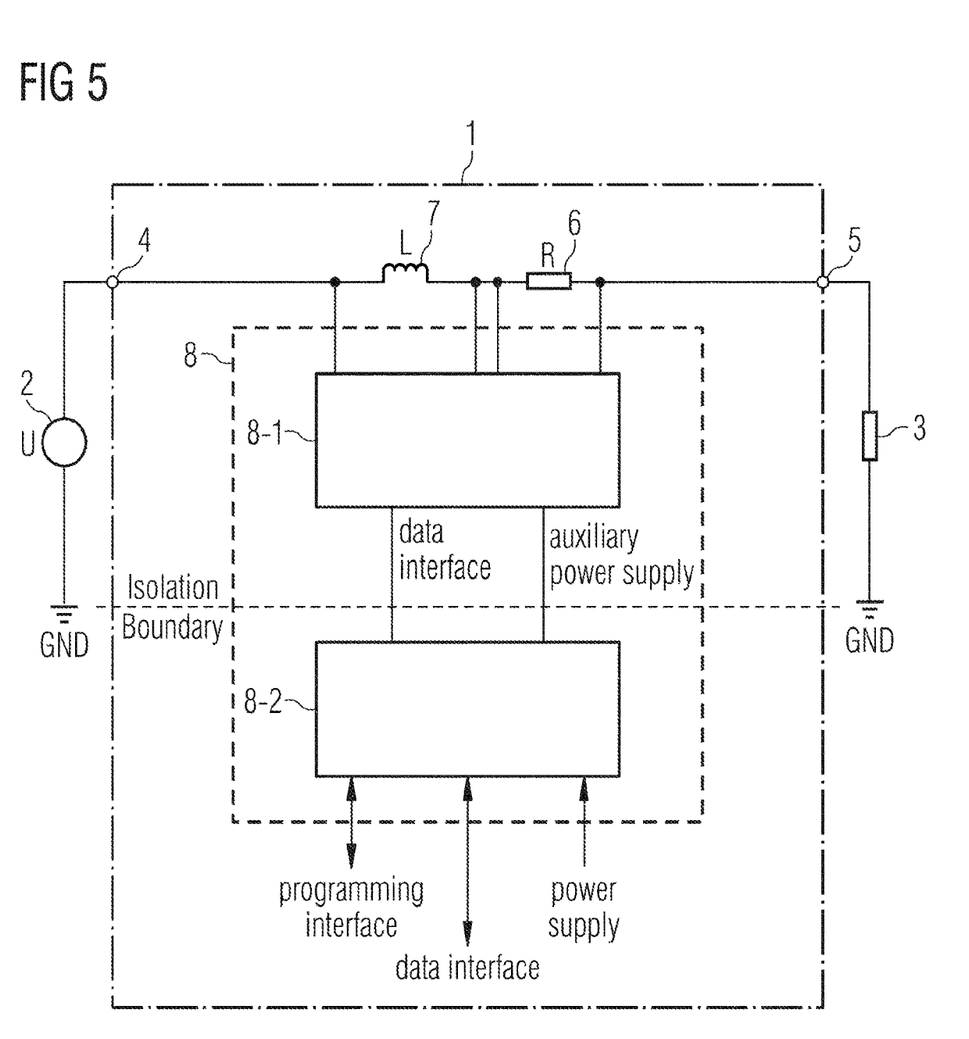
FIG. 5 shows a further circuit diagram for illustrating a possible exemplary embodiment of a short circuit detection apparatus according to the present invention.

FIG. 5 shows a further circuit diagram for illustrating a further possible embodiment of a short circuit detection apparatus 1 according to the present invention. In the embodiment illustrated in FIG. 5, the evaluation circuit 8 is split into a high voltage side 8-1 and a low voltage side 8-2.

The high voltage side 8-1 of the evaluation circuit 8 is connected to the monitored current path including the resistive element 6 and the inductive element 7. The high voltage side 8-1 is galvanically isolated with an isolation boundary from the low voltage side 8-2 as illustrated in FIG. 5. The short circuit detection apparatus 1 according to the present invention can be typically used for a power distribution system. In a power distribution system, normally multiple phases need to be analyzed and high voltage differences may occur from phase to phase or from phase to neutral. In the embodiment, illustrated in FIG. 5, the short circuit detection apparatus 1 therefore integrates galvanic isolation and an auxiliary power supply. To avoid any loss of accuracy, only digital data is exchanged from the high voltage side 8-1 to the low voltage side 8-2. The high voltage side 8-1 can comprise in a possible embodiment the programmable arithmetic unit 8A, a comparator 8D and the analog to digital converter 8I as well as the microcontroller 8H. Any information or data originating from the high voltage side 8-1 can be transferred via a digital interface (data interface) to the low voltage side 8-2. On the low voltage side 8-2, these data information can be directed to a general data interface or to a programming interface as illustrated in FIG. 5. The setup illustrated in FIG. 5 represents a single phase in a multiple phase application. In a multiple phase application, the short circuit detection apparatus 1 can be used to monitor several monitored current path simultaneously. In this embodiment, the evaluation circuit 8 as also illustrated in FIG. 1 can for instance be connected to three parallel monitored current paths each having an input terminal 4 and an output terminal 5 wherein each current path may transport a current phase L. The galvanic isolation provided by the embodiment illustrated in FIG. 5 eases connection to standard control equipment. Some three phase loads 3 such as three-phase electromotors are very sensitive to loss of one phase L. This can occur if the connection of one phase L is interrupted e.g. by a circuit breaker accidently or after a malfunction in one phase L. If a typical AC induction motor as a load 3 is operated at two phases L, the torque loses its predefined direction. If the load forces the AC induction motor 3 to stop now, the motor current reaches its startup value, being a magnitude bigger than the operating value. If the electrical current is not interrupted in the remaining phases L, the motor winding will fail.

FIG. 6 illustrates a further exemplary embodiment of a short circuit detection apparatus 1 according to the present invention. While galvanic isolation eases connection to standard control equipment, the addition of a load contactor or switch 9 within the monitored current path increases the possible functions provided by the short circuit detection apparatus 1. In order to achieve an optimum switching performance of the switch 9, two voltage measurement paths can be added as illustrated in FIG. 6. In the embodiment shown in FIG. 6, the short circuit detection apparatus 1 comprises a first voltage divider circuit 10 and a second divider voltage circuit 11. The first voltage divider circuit 10 comprises two resistors 10A, 10B connected to the input terminal 4 of the short circuit detection apparatus 1 as shown in FIG. 6. The second voltage divider circuit 11 also comprises two resistors 11A, 11B connected to the output terminal 5 of the short circuit detection apparatus 1 as shown in FIG. 6. The first voltage divider circuit 10 is adapted to divide the voltage supplied by the voltage source 2 via the input terminal 4 to the monitored current path to generate a source voltage measurement applied to the high voltage side 8-1 of the evaluation circuit 8 as shown in FIG. 6. The second voltage divider circuit 11 is adapted to divide the voltage supplied to the load 3 at the output terminal 5 to generate a load voltage measurement as also shown in FIG. 6. The generated source voltage measurement provided by the first voltage divider circuit 10 and the generated load voltage measurement provided by the second voltage divider circuit 11 are both supplied as input to the high voltage side 8-1 of the evaluation circuit 8. The high voltage side 8-1 of the evaluation circuit 8 is adapted to generate a control signal CRTL supplied to a control input of the switch 9 as shown in FIG. 6.

The switch 9 can be implemented in different ways, whereas two realizations are described in the following in more detail. An effective way to implement the switch 9 is using a contactor. This provides the advantages of low conduction losses and a broad range of rated load currents. However, a contactor acts quite slowly. Accordingly, it has to be chosen to withstand the maximum desired error current.

Another possible embodiment may use as a switch 9 a semiconductor switch, in particular a silicon carbide MOS-FET. The use of a silicon carbide MOSFET as the switch 9 allows for nearly real-time actuation. In this embodiment, a short circuit current can be switched off in a short switch-off time of less than 10 microseconds before it does reach a high amplitude, i.e. before exceeding a predefined amplitude threshold. The advantages of using silicon carbide MOS-FETs are a low resistance RDSon between the drain and source terminals being in a range of 10 mOhm while maintaining a high blocking voltage of more than 1200 Volt. The RDSon is the effective ohmic resistance between the drain terminal (D) and the source terminal (S) while the transistor is turned on. Such a transistor still fits typical $D^2PAK$ housings to ease PCB (Printed Circuit Board) integration.

Figure 7:
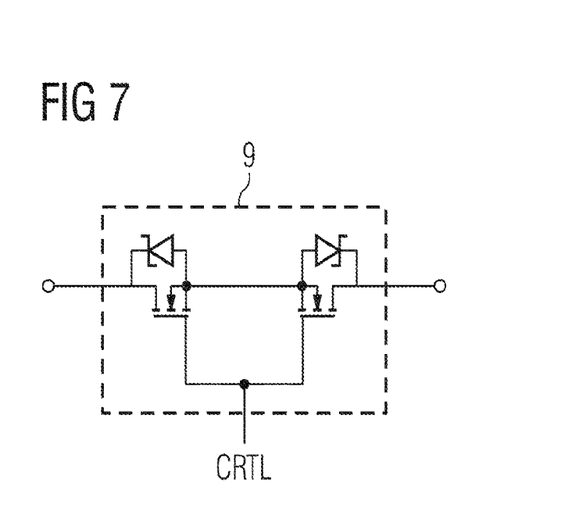
FIG. 7 shows a possible implementation of a switch provided within a monitored current path and controlled by a short circuit detection apparatus according to the present invention.

FIG. 7 shows a possible implementation where the AC switch 9 is implemented by two MOSFET transistors having gate terminals controlled by the control signal CRTL of the high voltage side 8-1 of the evaluation circuit 8. The information about a regular load current or short circuit current is available due to evaluation of the slope of the electrical load current. The switch control signal CRTL can be provided by two different sources. A first control source can be a user initiated switch command CMD which is surpassed via a data interface to the high voltage side 8-1 of the evaluation circuit 8 illustrated in FIG. 6. The local microcontroller 8H provided on the high voltage side 8-1 of the evaluation circuit 8 can check automatically if no errors are present and can turn on or off the switch 9 depending on user settable conditions. For example, an inductive load 3 shall be switched off at current zero crossing and switched on at voltage peak value. Any arbitrary condition can be set since all voltage and current information is available for the local microcontroller 8H provided at the high voltage side 8-1 of the evaluation circuit 8.

The actual state of the switch 9 can be further monitored using the load voltage measurement provided by the second voltage divider circuit 11. The load voltage can be set in correlation with the actual programmed switch control signal. Accordingly, this allows a kind of self-diagnostics of the switch status of the switch or actuator 9 and the voltage drop during switch-on time. The short circuit detection apparatus 1 forms a building block of a switch system that can permanently monitor also its own state and the load current and load voltage. Consequently adding such kind of intelligent switching blocks instead of standard switches gives any application much more transparency and insight in its current status. Furthermore, this also allows maintenance to be planned—the stress & switching cycles a specific element has seen is known and can be used to determine whether a maintenance service is required or not. In a conventional system the allowed switching cycles of a contactor are hard coded inside a PLC. If a counter reaches e.g. 90% of allowed cycles a service is planned. This does not account for errors occurring earlier or for replacing still fully functional devices. In contrast the system according the present invention including short circuit detection apparatuses 1 is capable of continuously monitoring all parameters and can indicate a need for a service depending on a real demand. This is more efficient and saves resources.

In case that the evaluation circuit 8 does detect any abnormal state, the comparator 8D of the evaluation circuit 8 can be triggered. A comparator output signal can be used to force the switch 9 off regardless of a user initiated control command CMD. In a possible embodiment, the off state of the switch can be latched until it is cleared by another user command of a user.

In a possible embodiment, a special signal path in parametric hardware as described allows a nearby real-time operation. As a compromise between low short circuit current amplitudes and the provision of some immunity against false triggering, a response time of 10 microseconds to 20 microseconds can be implemented. In a further possible embodiment, a temperature measurement of the load switch can be performed to provide additional self-diagnostic features.

Figure 8:
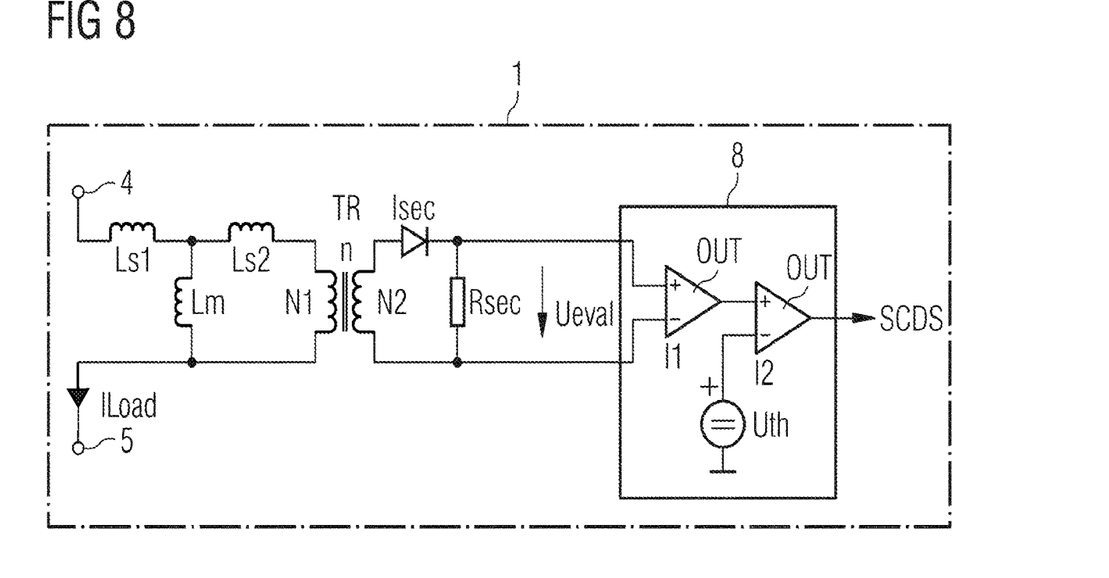
FIG. 8 shows a further circuit diagram for illustrating a possible exemplary embodiment of a short circuit detection apparatus according to the present invention.

FIG. 8 illustrates a further exemplary embodiment of a short circuit detection apparatus 1 according to the present invention using a current transformer TR. The transformer can comprise a lossless transformer. In the illustrated embodiment, the inductive element 7 can comprise an inductance of the transformer having a primary winding provided in the monitored current path and having a secondary winding connected to the arithmetic unit 8A of the evaluation circuit 8. The inductance of the transformer TR can comprise a stray inductance and a magnetizing inductance. In the illustrated exemplary embodiment, the resistance of the primary winding of the transformer TR can form the resistive element of the monitored current path.

The invention claimed is:

1. A short circuit detection apparatus for detection of an electrical short circuit current flowing in at least one monitored current path from a voltage source to an electrical load, wherein the short circuit detection apparatus is connected to the monitored current path and comprises an evaluation circuit including:
   at least one programmable or preprogrammed arithmetic unit adapted to perform at least one arithmetic combination operation, ACOP, on a first voltage, UR, provided by a resistive element of the monitored current path and being proportional to the electrical current, I, flowing via the monitored current path and on a second voltage, UL, provided by an inductive element of the monitored current path and depending on a derivative of the electrical current, dI/dt, flowing via the monitored current path to provide a combined sensor voltage and including
   a comparator adapted to compare the combined sensor voltage provided by the programmable or preprogrammed arithmetic unit with a preset or an adjustable threshold voltage to generate a short circuit detection signal (SCDS) if the combined sensor voltage exceeds the threshold voltage,
   wherein the first voltage, UR, and/or the second voltage, UL, are amplified by an associated amplifier of the evaluation circuit to provide amplified voltages, wherein each amplifier of the evaluation circuit comprises an adjustable gain and an adjustable offset, wherein the amplified first voltage, UR_amp, output by a first amplifier of the evaluation circuit and the amplified second voltage, UL_amp, output by a second amplifier of the evaluation circuit are both supplied as input to the programmable or preprogrammed arithmetic unit of the evaluation circuit which is adapted to perform the at least one arithmetic combination operation, ACOP, on the input amplified voltages to provide the combined sensor voltage applied to the comparator of the evaluation circuit, wherein a first sign of the amplified first voltage, UR_amp, output by a first amplifier of the evaluation circuit and a sign of the amplified second voltage, UL_amp, output by a second amplifier of the evaluation circuit are both determined and evaluated, wherein if the first and second sign are not equal the generation of the short circuit detection signal is automatically inhibited to avoid a false triggering of the comparator of the evaluation circuit.

2. The short circuit detection apparatus according to claim 1, wherein the programmable arithmetic unit of the evaluation circuit is adapted to perform the at least one arithmetic combination operation, ACOP, on the first voltage, UR, and the second voltage, UL, by performing at least an arithmetic summation operation, ACOP1, an arithmetic multiplication operation, ACOP2, and/or an arithmetic power or exponentiation operation, ACOP3.

3. The short circuit detection apparatus according to claim 1, wherein the short circuit detection signal (SCDS) output by the comparator of the evaluation circuit is supplied to a control logic adapted to control at least one switch or other actuator provided in the monitored current path, wherein the switch of the monitored current path comprises a semiconductor switch, in particular a MOSFET, or an electromechanical switch, in particular an electromagnetic relay.

4. The short circuit detection apparatus according to claim 3, wherein the semiconductor switch of the monitored current path comprises the resistive element of the monitored current path.

5. The short circuit detection apparatus according to claim 1, wherein the inductive element of the monitored current path comprises a coil connected in series with the resistive element in the monitored current path.

6. The short circuit detection apparatus according to claim 1, wherein the inductive element comprises an inductance of a transformer having a primary winding provided in the monitored current path and having a secondary winding connected to the arithmetic unit of the evaluation circuit, wherein the inductance of the transformer comprises a stray inductance and a magnetizing inductance, wherein the resistance of the primary winding of the transformer forms the resistive element of the monitored current path.

7. The short circuit detection apparatus according to claim 1, wherein:
the voltage source comprises a voltage source of a power distribution system or of a power supply system including an AC voltage source providing an AC current flowing in the monitored current path to the electrical load, or
including a DC voltage source providing an DC current flowing in the monitored current path to the electrical load.

8. The short circuit detection apparatus according to claim 1, wherein the programmable or preprogrammed arithmetic unit of the evaluation circuit comprises a programmable hardware device, in particular a field programmable gate array, a digital signaling processor, an ASIC or another hardwired circuit adapted to perform the at least one arithmetic combination operation, ACOP.

9. The short circuit detection apparatus according to claim 1, wherein the evaluation circuit of said short circuit detection apparatus further comprises a microcontroller adapted to set operation parameters of the programmable or preprogrammed arithmetic unit, operation parameters of the amplifiers and operation parameters of the comparator of the evaluation circuit and having access to a non-volatile memory of said short circuit detection apparatus, wherein the non-volatile memory stores multiple selectable configuration setups of operation parameters.

10. The short circuit detection apparatus according to claim 9, wherein the evaluation circuit of said short circuit detection apparatus further comprises an analog to digital converter, ADC, adapted to convert the first voltage, UR, provided by the resistive element of the monitored current path, the second voltage, UL, provided by the inductive element of the monitored current path and/or adapted to convert the amplified first voltage, UR_amp, output by the first amplifier of the evaluation circuit and the amplified second voltage, UL_amp, output by the second amplifier of the evaluation circuit to provide corresponding digital voltage values supplied by the analog to digital converter, ADC, to the microprocessor of the evaluation circuit adapted to process the received digital voltage values to determine an actual load current value and/or to analyze in real time a regular operation behavior of the power supply system or of the power distribution system.

11. The short circuit detection apparatus according to claim 9, wherein
at least one arithmetic combination operation executed by programmable or preprogrammed arithmetic unit of the evaluation circuit is selected in response to a selection control signal generated by the microprocessor of the evaluation circuit,
wherein the microprocessor is connected via a programming interface and/or data interface to a remote or local controller and/or to a local user interface of the short circuit detection apparatus.

12. The short circuit detection apparatus according to claim 1, wherein:
the evaluation circuit of said short circuit detection apparatus comprises
a high voltage side connected to the monitored current path and comprising a low voltage side being galvanically isolated from the high voltage side of the evaluation circuit, wherein the high voltage side of the evaluation circuit comprises
the programmable or preprogrammed arithmetic unit, the comparator, the analog to digital converter, ADC, and the microcontroller.

13. The short circuit detection apparatus according to claim 12, further comprising:
a first voltage divider adapted to divide the voltage supplied by the voltage source to the monitored current path to generate a source voltage measurement and
a second voltage divider circuit adapted to divide the voltage supplied to the connected load to generate a load voltage measurement, wherein the generated source voltage measurement and the generated load voltage measurement are applied as input to the high voltage side of the evaluation circuit.

14. The short circuit detection apparatus according to claim 9, wherein the microcontroller is adapted to perform in real time a FFT analysis to determine harmonics within the electrical load current and/or is adapted to calculate in real time an I2t value of the electrical load current as a stress indicator.

15. The short circuit detection apparatus according to claim 1, wherein the inhibition of the generation of the short circuit detection signal comprises automatically inhibiting the arithmetic combination operation performed by the programmable or preprogrammed arithmetic unit.

16. A system comprising at least one short circuit detection apparatus according to claim 1 having an actuator and being adapted to perform a self-diagnosis of the momentary switch state of said actuator.

* * * * *